United States Patent [19]

Chi

[11] 4,311,738
[45] Jan. 19, 1982

[54] METHOD FOR RENDERING NON-FERROUS METALS CORROSION RESISTANT

[75] Inventor: Frank K. Chi, Midland, Mich.

[73] Assignee: Dow Corning Corporation, Midland, Mich.

[21] Appl. No.: 153,379

[22] Filed: May 27, 1980

[51] Int. Cl.³ .............................................. B05D 3/02
[52] U.S. Cl. ................................. 427/387; 106/287.12; 106/287.13; 260/28.2 M; 427/388.2; 427/388.4; 427/389.7; 428/447; 428/450
[58] Field of Search ................. 427/389.7, 387, 388.2, 427/388.4; 106/287.12, 287.13, 287.34, 299, 300; 428/447, 446, 450; 260/29.2 M

[56] References Cited

U.S. PATENT DOCUMENTS

| | | | |
|---|---|---|---|
| 3,061,467 | 10/1962 | Vincent | 427/387 |
| 3,101,277 | 8/1963 | Eder et al. | 427/387 |
| 3,395,036 | 7/1968 | Campbell | 106/287.13 X |
| 3,397,046 | 8/1968 | Greyson | 29/195 |
| 3,460,956 | 8/1969 | Dahle | 106/297.12 |
| 3,460,975 | 8/1969 | Stebleton | 427/2 |
| 3,460,980 | 8/1969 | Burzynski | 427/387 |
| 3,687,882 | 8/1972 | Bishop | 260/29.2 M |
| 3,813,363 | 5/1974 | Schmidt et al. | 260/29.3 |
| 3,817,905 | 6/1974 | Lerner et al. | 260/37 R |
| 3,959,566 | 5/1976 | Pangonis | 106/287.16 X |
| 3,976,497 | 8/1976 | Clark | 428/447 X |
| 3,986,997 | 10/1976 | Clark | 260/29.2 M |
| 4,027,073 | 5/1977 | Clark | 428/412 |
| 4,042,749 | 8/1977 | Sandvig | 428/412 |
| 4,159,206 | 6/1979 | Armbruster et al. | 106/287.12 |

FOREIGN PATENT DOCUMENTS 1941328 3/1971 Fed. Rep. of Germany.
1004893 9/1965 United Kingdom.

*Primary Examiner*—Michael R. Lusignan
*Assistant Examiner*—Thurman K. Page
*Attorney, Agent, or Firm*—Richard E. Rakoczy

[57] ABSTRACT

Non-ferrous metal substrates such as aluminum are coated with a composition consisting essentially of a dispersion of colloidal titania particles in a water/polar organic solvent medium of a partial condensate formed by hydrolyzing a silane such as methyltrimethoxysilane in the presence of the colloidal titania particles and in the presence of a sufficient amount of an acid such as acetic acid to provide a pH in the range of from 2 to 6. Optionally, the composition can contain up to 20 weight percent of colloidal silica and/or up to 5 weight percent of other types of monoorganosilsesquioxanes based upon the total weight of solids in the composition. The coated substrates are heated until the coating cures, preferably at 50° C. to 150° C., to form a transparent coating which renders the substrate more resistant to corrosion induced by acids or salts such as road salt or ocean spray.

11 Claims, No Drawings

METHOD FOR RENDERING NON-FERROUS METALS CORROSION RESISTANT

BACKGROUND OF THE INVENTION

1. Field of the Invention

This invention relates to a method of rendering non-ferrous metal substrates more resistant to corrosion which involves coating the substrate with a particular type of pigment-free coating composition and curing the same to form a transparent protective coating.

2. Description of the Prior Art

Problems arising from the corrosion of metals induced by the action of acids, salts and other influences such as atmospheric pollution are well known. Many protective coating compositions have been proposed in the past such as coating compositions prepared from monoorganosilanes or hydrolysis products thereof. Examples of such coatings are those taught by Eder et al. in U.S. Pat. Nos. 3,101,277, Burzynski in 3,460,980 and Vincent in 3,061,467. While transparent coatings of the compositions described in the above patents are relatively economical, especially when only methyl trimethoxysilane is used, and do offer a certain amount of corrosion protection, it is desirable to obtain coatings of this type which offer an increased amount of corrosion protection to non-ferrous metal substrates.

The use of metal catalysts which are said to accelerate the condensation of organosilicon compounds has been proposed to increase the hardness, solvent resistance or corrosion resistance of such coatings. For example, Eder suggests that the corrosion resistance offered by coatings of the compositions he teaches can be increased through the use of condensation catalysts such as metal salts of carboxylic acids and the alcoholates of heavy metals such as titanic acid esters such as tetrabutyl titanate. However, Eder requires that the metal be heated to 350° C.-600° C. for curing and the effect of the catalyst at such a high curing temperature appears to be minimal. Sandvig, in U.S. Pat. No. 4,042,749, teaches that cured coatings of a mixture of a reactive silane and a metal ester can be used to render metals corrosion resistant, but requires a silane containing a reactive group such as epoxy or vinyl and teaches away from using completely hydrolyzed mixtures of reactants.

Tetraalkyl titanates are known to be readily hydrolyzed by water and eventually complete hydrolysis of such compounds is believed to lead to the formation of hydrated species of titanium dioxide. Dahle, in U.S. Pat. No. 3,460,956, teaches compositions which are prepared by hydrolyzing tetraalkyl titanates with more than 1.5 moles of water in the presence of lactic or nitric acid in a lower alkanol in which both the reactants and the reaction product are soluble. The compositions contain more than the stoichiometric amount of water, but are described as being clear, water insoluble homogeneous solutions. These compositions are then coated on plastic, glass, steel or aluminum substrates to produce what are described as hard transparent surface coatings after heat curing.

Due to their ability to irreversibly react with moisture, metal alkoxides such as tetrapropyl titanate and aluminum isopropoxide have been suggested by Greyson in U.S. Pat. No. 3,397,046 for use in polysiloxane coatings used to prevent red-corrosion of silver-plated copper conductors. Likewise, Eberius in German OS 1,941,328, suggests the inclusion of organic titanium compounds in solvent solutions of synthetic, halogen-free, water- and acid-resistant binders to protect metallic surfaces such as aluminum and copper with a transparent coating because the titanium compounds can react with corrosive agents in the atmosphere such as sulfuric acid to form colorless reaction products. It would appear that completely hydrolyzed titanium compounds in the form of oxides would not be desirable for use in these applications.

Coating compositions useful in protecting metal substrates from the effects of corrosion are described in British Pat. No. 1,004,893 to the Dow Corning Corporation, in U.S. Pat. No. 3,687,882 to Bishop and U.S. Pat. No. 3,817,905 to Lerner et al. The British patent to Dow Corning is directed to a binder composition containing an organosiloxane resin and 6.5 to 14 percent by weight of a titanium ester. A metallic pigment such as zinc or aluminum is added to the binder to produce a coating composition curable to a corrosion resistant coating useful in protecting metals from corrosion such as that caused by salt spray from the ocean. The binder composition does not appear to contain water nor is anything taught about the ability of the binder itself to render metals corrosion resistant. Furthermore, one would not expect compositions containing metal pigments to be transparent.

The Bishop patent describes a silane-titanate dispersion for coating aluminum to protect the surface of the metal from corrosion. The disperion is prepared by cohydrolyzing a monoorganotrialkoxysilane with a tetraalkyl titanate (usually as a chelate of a 1,3-dioxo compound such as the acetoacetonate chelate of tetraisopropoxy titanate) in a water/alcohol/acid mixture. The solvent mixture is adjusted by removing some of the volatile components by distillation and adding water or an aqueous alkanol solution to the desired solids content. Colloidal alumina can be added to the dispersion when the coated aluminum article is to be adhered through an organic adhesive to another surface. The actual corrosion-resistant coating composition is prepared by adding a hexavalent chromium compound to the above dispersion and applying that mixture to a clean aluminum surface. The silane-titanate codispersion requires a specific type of silane wherein the monoorgano radical attached to silicon by means of a silicon-carbon bond must contain at least one hydroxy radical or other radical such as glycidoxy which will yield a hydroxy radical upon hydrolysis. Bishop does not appear to suggest that the aqueous silane-titanate dispersion itself would have any particular utility in rendering aluminum substrates more resistant to corrosion in the absence of a hexavalent chromium compound.

Lerner, et al., in U.S. Pat. No. 3,817,905, describes a coating composition consisting of a binder composition containing a particulate solid, such as zinc dust, which will impart galvanic protection to metal substrates coated with such a coating composition. The binder composition is prepared by hydrolyzing an organotrihydrocarbonoxy silane such as methyltriethoxysilane in the presence of at least 0.6 moles, preferably 1.0–4.5 moles, of water per hydrocarbonoxy radical, a solvent such as a higher boiling ether or an alcohol and a sufficient amount of an acid to provide a pH of from 1.0 to about 5.5. Furthermore, Lerner et al. teach that a sufficient amount of a hydrolyzable tetraalkyl titanate, or partial hydrolyzate thereof, should be incorporated in the binder composition to improve the physical properties, such as hardness, solvent resistance and adhesion characteristics, of the coating composition. The amount of said titanium compound in the coating composition is said to range from about 0.1 to 5 percent, preferably from 0.5 to about 2.0 percent, by weight based on the weight of the hydrocarbonoxy silane. Furthermore, Lerner et al. teach that the titanium compounds may be combined with the silanes in any suitable manner to form the binder compositions. Example 1 of the U.S. Pat. No. 3,817,905 teaches that the binder composition can be prepared by slowly adding methyltriethoxysilane to a reactor containing water, ethylene glycol monoethyl ether, a very small amount of hydrochloric acid catalyst and tetrabutyl titanate (the weight ratio of silane to titanate being 50:1) and thereafter continuing to agitate the reaction mixture for 2 hours at a temperature of up to 60° C. Then 30 parts of binder was added to 70 parts of zinc dust to prepare a coating composition. When coated on a steel panel and cured, the pencil hardness of the coating was reported to be about 3H while a similar composition prepared in the absence of tetrabutyl titanate had a pencil hardness of about H. The binder prepared in this manner would possibly contain hydrated forms of titanium dioxide particles because the titanate was added to a relatively large excess of water. Examples 2 and 3 teach alternate methods for preparing the binder compositions and no one procedure is described as being preferred over the other. Furthermore, Lerner et al. does not suggest that the inclusion of the small amounts of tetraalkyl titanate taught will improve the corrosion resistance of the coating, and in fact, does not suggest that the binder composition itself, in the absence of the particulate solids, will be useful in protecting non-ferrous metal substrates such as aluminum from corrosion. Also, coating compositions containing particulate solids would not be expected to produce transparent coatings.

In U.S. Pat. No. 3,395,036, Campbell teaches a process for post-finishing pigmented glass fabrics utilizing a post-finish consisting essentially of (a) from 1 to 8 parts by weight of a monoorganosilane such as methyltrimethoxysilane, (b) 0.5 to 4 parts of an organotitanium or organozirconium compound such as tetraethyl titanate and tetraisopropyl zirconate, the weight ratio of (a) to (b) being from 1:1 to 10:1 and (c) 100 parts by weight of water where the pH of the post-finish is from 2.5 to 6.0. Preferably, zirconium compounds are employed. The non-volatile or solids portion of such compositions is rather low, no additional solvent is suggested to stabilize the solution, and no other use for the post-finish composition is suggested.

Stebleton, in U.S. Pat. No. 3,460,975 teaches a process for making tack-free silicone rubber articles for medical use by coating the surfaces of silicone rubber articles with (1) an alkyl titanate such as tetrabutyl titanate, (2) a silane such as methyltrimethoxysilane, or a partial hydrolyzate of (1) and (2), and (3) a volatile solvent such as diethyleneglycoldimethyl ether and curing the coating, but teaches nothing about coating non-ferrous metals with compositions containing colloidal titania to improve the corrosion resistance of the metal.

Pigment-free transparent coatings consisting of an acidic dispersion of colloidal silica in the partial condensate of a silanol which is principally derived from $CH_3Si(OH)_3$ which are useful as abrasion resistant coatings for plastics and corrosion resistant coatings for aluminum are taught by Clark in U.S. Pat. Nos. 3,986,997 and 4,027,073. While these compositions offer cured coatings possessing high abrasion resistance, the colloidal silica component which contributes to the abrasion resistance is rather expensive and makes the composition less desirable in applications where the high abrasion resistance possessed by such compositions is not required. Paint compositions containing pigments such as titanium dioxide carried in a binder composition of the type described in the above U.S. Pat. No. 3,986,977 are taught by Clark in U.S. Pat. No. 3,976,497. Pigments may reduce the cost of the composition, but can also reduce the transparency of the pigment-free coating compositions.

Schmidt, in U.S. Pat. No. 3,813,363 teaches that organic and inorganic colloidal sols which are stable at an alkaline pH can be added to water soluble cyclic sulfonium zwitterions to produce alklaine aqueous coating compositions which cure to transparent coatings possessing superior scratch resistance when colloidal silica is used. Many other types of colloidal sols are disclosed as being useful including those from water insoluble inorganic oxides and pigments such as alumina, titanium dioxide and the like which are colloidal in size. Nothing is taught concerning the effect of the addition of colloidal oxide particles on the ability of a coating to render non-ferrous metals more resistant to corrosion.

Due to the fact that aluminum articles are strong, lightweight, and attractive in appearance and because the metal itself is recyclable, it is widely being used in place of traditional metals such as steel in automobiles, transportation equipment, ornamental trim articles and cans. It would be highly desirable to obtain an aluminum or non-ferrous metal article which maintains its natural appearance even though it is exposed to potentially corrosive conditions such as road salt or ocean spray.

SUMMARY OF THE INVENTION

Surprisingly, it has been discovered that the use of a relatively small amount of colloidal size titania particles of a rather uniform particle size distribution results in a significant increase in the ability of a partial condensate essentially derived from methyltrisilanol to protect non-ferrous metal substrates, especially aluminum substrates, from the effects of corrosive agents such as acids and ionic salts. Typically, the pigment-free coating compositions used are prepared by hydrolyzing a methyltrialkoxysilane in the presence of an acidic colloidal titania sol to form an acidic water/polar organic solvent dispersion of the colloidal titania particles in a partial condensate of methyltrisilanol. Optionally, up to 20 weight percent of colloidal silica (based on the total weight of colloidal particles and partial condensate present) and/or up to 5 weight percent of other types of monoorganosilanes (based on the total weight of partial condensate) can be included in each composition to increase the abrason resistance or adhesion of the cured coatings. The method of the present invention involves coating the above composition on a non-ferrous metal substrate and curing the composition to form a transparent coating which protects the metal from corrosion.

Ronald H. Baney and Frank K. Chi, in a U.S. patent application entitled "Pigment-Free Coatings With Improved Resistance to Weathering", Ser. No. 35,353, filed on May 2, 1979 and assigned to the same assignee as the present invention, describe a pigment-free coating composition wherein the solids consists essentially of from 20 to 56 weight percent colloidal silica, 1 to 10 weight percent colloidal titania and from 34 to 79 weight percent of the partial condensate of a silanol, at least 70 weight percent of which is derived from methyltrisilanol. The compositions form transparent highly abrasion resistant coatings which can be used to protect the surfaces of plastics from scratching and the effects of weathering and also as coatings for non-ferrous metal such as aluminum which provide transparent coatings with an improved amount of corrosion resistance when compared with coatings which do not contain colloidal titania. However, the colloidal silica itself offers a certain degree of corrosion protection and as the amount of colloidal silica is decreased from the maximum allowed, the effect of small amounts of the colloidal titania on the corrosion resistance becomes more apparent, but the abrasion resistance of the curing coating also decreases. Because the colloidal silica is one of the most expensive raw materials, more economical coating compositions can be prepared by minimizing the amount of colloidal silica present in the coating composition. Thus, the compositions described by Baney and Chi above differ from the compositions used in the present invention because the composition used in this invention do not provide the high abrasion resistance of the Baney and Chi compositions, but can provide hard, more economical coatings which provide equivalent or better resistance to corrosion in non-ferrous metal coating applications which do not require high abrasion resistance.

DESCRIPTION OF THE INVENTION

This invention relates to a method for rendering a non-ferrous metal substrate more resistant to corrosion which comprises the steps of (I) coating a non-ferrous metal substrate with a pigment-free composition capable of forming an optically transparent cured coating which consists essentially of a dispersion of at least one colloidal metal oxide in a water/polar organic solvent solution of a partial condensate of a silanol having the average formula $CH_3Si(OH)_3$, said colloidal metal oxide being prepared by a solution precipitation method and being selected from the group consisting of colloidal titania and both colloidal titania and colloidal silica, said composition containing from 15 to 40 weight percent solids wherein said solids consist essentially of from 1 to 25 weight percent of said colloidal titania and from 0 up to, but not including, 20 weight percent of said colloidal silica, the remainder of said solids consisting essentially of said partial condensate calculated as $CH_3SiO_{3/2}$, said composition containing a sufficient amount of acid to provide a pH in the range of from 2 to 6, and (II) curing said coating.

The term "non-ferrous metal substrate" is intended to mean metals which do not contain iron such as copper, aluminum and brass. This method is especially useful in protecting aluminum metal substrates from the effects of corrosion induced by exposure to acids such as hydrochloric acid or salts such as sodium chloride.

The nonvolatile solids portion of the unpigmented coating composition described above consists of a mixture of colloidal titania and the partial condensate of a silanol, also called a siloxanol, obtained from the condensation of $CH_3Si(OH)_3$. The term "consisting essentially of said partial condensate" is intended to mean that a minor portion of the partial condensate, less than 5 weight percent of the total amount of parital condensate, may be obtained from condensation with $C_2H_5Si(OH)_3$, $C_3H_7Si(OH)_3$, $CH_2=CHSi(OH)_3$, $C_6H_5Si(OH)_3$, $(CH_3)_2CHSi(OH)_3$, $F_3C(CH_2)_2Si(OH)_3$, $Cl(CH_2)_3Si(OH)_3$, $HS(CH_2)_3Si(OH)_3$, or mixtures thereof. However, these silanes add to the cost of the compositions. To obtain the best compromise between economy and optimum properties in the composition and the cured coating, utilization of all monomethyltrisilanol in the formulation is preferred.

The silanol is (or silanols are) generated by adding the corresponding trialkoxysilane(s) to an acidic water-water miscible solvent dispersion of colloidal titania to form a dispersion. Methyltrimethoxysilane is the preferred trialkoxysilane. If up to but not including, 20 weight percent of colloidal silica is to be included in the composition, coating compositions can be prepared by adding a silanol-colloidal titania dispersion to a pigment-free composition containing a sufficient amount of silanol and colloidal silica to provide a blended composition which contains the desired amounts of silanol, colloidal titania and colloidal silica. Pigment-free compositions containing silica which can be useful in preparing the above compositions are taught by Clark in U.S. Pat. No. 3,986,997 which is hereby incorporated by reference to teach the materials used in and the production of such compositions, especially those which contain methyltrisilanol as the sole source of silanol and those which contain a sufficient additional amount of the other silanols, such as $CH_2=CHSi(OH)_3$, mentioned above such that the total amount of the partial condensate in the blended composition attributable to the other silanols is less than 5 weight percent.

In generating the silanols, suitable trialkoxysilanes are those containing methoxy, ethoxy, propoxy or isopropoxy substituents which, upon hydrolysis, liberate the corresponding alcohol and thus generate at least a portion of the polar organic solvent, in this case alcohol, present in the coating composition. Clark, supra, suggests the following mechanism for formation of a partial condensate. Upon generation of the silanol in the acidic aqueous medium, there is condensation of the hydroxyl substituents to form Si-O-Si bonding. The condensation is not complete but rather the siloxane retains an appreciable quantity of silicon-bonded hydroxyl groups, thus rendering the polymer soluble in the water-alcohol cosolvent. During the curing of the coating on a substrate, these residual hydroxyls condense to give a silsesquioxane such as $CH_3SiO_{3/2}$ when the silanol is completely derived from $CH_3Si(OH)_3$.

The term "colloidal titania" is intended to mean that the titania or titanium dioxide is produced by a solution precipitation method and the titania is present in the form of a substantially monodispersed colloidal suspension or sol of titania particles (a titania sol) with an average primary particle size in the range of from 5 to 150 millimicrons, preferably from 5 to 40 millimicrons in diameter. It is believed that a small amount of low molecular weight species of polytitanic acid will be present in such colloidal dispersions, but it is believed that the presence of such species does not detract from the corrosion protecting properties of the cured compositions as long as the composition consists essentially of titania particles. For best results, the colloidal titania should be substantially free of aggregates of primary particles having a maximum particle size greater than 150 millimicrons. Fine particle size titania powders (nominally 30 millimicrons in diameter) produced by flame hydrolysis methods (fume titania) are believed to contain a substantial number of aggregated particles of various sizes and do not appear to be useful in the compositions of the present invention. The particles are not substantially monodisperse and typically produce coatings which are hazy or translucent, rather than optically transparent. The finer particle size colloidal titania in substantially monodispersed form obtained from water/polar organic solvent sols gives the best results in terms of transparency and corrosion protection. While not desiring to limit the scope of the invention by such a hypothesis, it is believed that the colloidal sized titania particles may associate with the surface of the metal to be protected and inhibit the corrosive effects of ions such as chloride ions.

Several sources of precipitated colloidal titania dispersions or sols having a particle size in the range of 5 to 150 millimicrons are available. Weiser, Inorganic Colloidal Chemistry, vol. 2, p. 281 (1935) describes production of acidic titania sols by hydrolysis of titanium tetrachloride, by peptizing hydrous titanium dioxide with tartaric acid and by peptizing ammonia washed Ti($SO_4$)$_2$ hydrolyzate with a small amount of hydrochloric acid. See also Matijevic, Budnik and Meites, Journal of Colloidal and Interface Science 61:302–311 (1977). One difficulty with production of titania sols by these methods is the necessity for removing sulfate, chloride, and other ions formed during the production of the sols. Removal of these ions is accomplished by the use of dialysis or ion-exchange resins which adds to the cost of the final product.

A relatively uncomplicated and preferred method for the preparation of a stable acidic dispersion of colloidal titania having a low ion content was developed for use in the following invention. The method employed consists of hydrolysis of an acidified alkyl orthoester of titanic acid (hereinafter referred to as an alkyl titanate) in a water or water-alcohol medium. Specifically, the method comprises (1) preparation of a premix of (a) an alkyl titanate, (b) a sufficient amount of an acid to product a final pH of 1.0 to 3.0 in said colloidal dispersion and (c) a water miscible alcohol; (2) producing said colloidal dispersion by adding to the premix an amount of water which is sufficient to effect complete hydrolysis of the alkyl titanate; and (3) dispersing the resulting colloidal dispersion until it is homogeneous, said colloidal dispersion containing 0.1 to 10 weight percent titania, said titania consisting essentially of substantially monodispersed particles falling in the range of 5 to 150 millimicrons in diameter.

To obtain complete hydrolysis of the titanate and to prevent gelation of the sol during preparation, the pH of the final sol must be maintained at 1.0 to 3.0, preferably 2.0. Suitable acids include both organic and inorganic acids such as acetic, hydrochloric, and nitric. Sulfuric acid did not appear to be useful in preparing sols. The specific acid utilized has a direct effect on the rate of silanol condensation and this in turn determines shelf life of the coating composition itself. Thus, selection of an acid for use in adjusting the pH of the sols must be made with the properties of the final coating composition in mind. Titania sols generally tend to be stable at lower pH values than are colloidal silica sols. The stronger acids such as hydrochloric acid gave appreciably shortened room temperature shelf life to the coating composition and require less aging to obtain the described partial condensate. Thus, when colloidal silica-containing pigment-free compositions are used, it is desirable to use the same acid in the colloidal silica-containing pigment-free composition as is used in the titania sol to give a consistent shelf life to the final composition obtained. It is preferable to use a sufficient amount of a water-miscible carboxylic acid such as acetic acid to provide a pH of about 2 when preparing the titania sol.

The alkyl titanates useful in preparing the titania sol are the alkyl orthoesters of titanic acid of the formula Ti(Or$^1$)$_4$ where R$^1$ is an alkyl group containing 2 to 6 inclusive carbon atoms such as tetraethyl titanate, tetraisopropyl titanate, tetraisopropyl titanate, tetrapropyl titanate, tetrabutyl titanate, tetraisobutyl titanate, and tetrahexyl titanate. Other titanates useful in the preparation of the titania sol are partially hydrolyzed alkyl titanates which have condensed to give a product of the average formula (R$^1$O)$_{2x+2}$—Ti$_x$O$_{x-1}$ where R$^1$ is an alkyl radical of 2 to 6 inclusive carbon atoms and x is some positive integer greater than 1, the actual value of x being dependent upon the amount of acid and water present when the hydrolysis and condensation took place. One such compound is described as a "polymerized C$_4$ alkyl titanate" and is commerically available under the tradename of "TYZOR PB" from E. I. dePont de Nemours & Company, Wilmington, Del. Isopropanol solvent is preferred for the coating composition because it promotes adhesion to the substrate; therefore the use of tetraisopropyl titanate is preferred since hydrolysis of that titanate generates the desired solvent. The amount of titanate added initially is that amount necessary to provide from 0.1 to 10 weight percent titania (calculated as TiO$_2$) in the sol, preferably that amount necessary to provide from 4–6 weight percent titania.

The amount of water required is at least that amount necessary to effect complete hydrolysis of all the ester linkages or 2 moles of water per mole of titanate. Generally, the amount of water added ranged between 20 and 160 moles of water per mole of alkyl titanate, preferably between 20 and 80 moles of water per mole of alkyl titanate. In any event, the titanate must be completely hydrolyzed and substantially in particulate form prior to the addition of the alkyltrialkoxysilanes.

The alcohol resulting from the hydrolysis of the titanate will be present in the sol. In the case of tetraisopropyl titanate acidified with acetic acid, a sol can be produced which is stable without addition of any further alcohol. Addition of further amounts of alcohol may increase or decrease the stability of the sol. When hydrochloric acid or nitric acid is used, addition of extra isopropanol increases sol stability.

Any water-miscible alcohol, or mixture of several alcohols, especially where one is not in itself miscible with water, can be used to stabilize the sol. Examples of some useful alcohols are lower aliphatic alcohols containing from 1 to 4 inclusive carbon atoms such as methanol, ethanol, n-propanol, isopropanol, n-butanol, isobutanol, t-butanol, glycol ether alcohols derived from ethylene or propylene glycol such as ethylene glycol monomethyl ether, ethylene glycol monoethyl ether, ethylene glycol monobutyl ether, propylene glycol monomethyl ether and the like. Isopropanol is the preferred alcohol. Acids also contribute to the stability of the titania sols and can also constitute a significant portion of the titania sol in the case of a liquid organic acid such as glacial acetic acid.

The titania sol which is formed exhibits the Tyndall Effect, i.e., a white light entering the sol is scattered by the particles and appears blue. The color of the scattered light is dependent upon the particle size of the particles in the dispersion. Exhibition of the Tyndall Effect indicates that the colloidal particles are substantially monodispersed for the purposes of the present invention and have a particle size in the range of about one-tenth to one-twentieth the wavelength of visible light (380-780 millimicrons). Electron photomicrographs of the titania sol demonstrate that colloidal particles are formed. Electron diffraction studes of the titania sol demonstrate that the particles are essentially anatase titanium dioxide. Titania sols which exhibit the Tyndall Effect and appear blue in color are preferred. To obtain the optimum level of optical transparency, titania sols having a particle size in the range of 5 to 40 milimicrons in diameter are preferred.

As disclosed in Clark, U.S. Pat. No. 3,986,997, the silica component of the composition is present as colloidal silica. Aqueous colloidal silica dispersions (sols) generally have a particle size in the range of 5 to 150 millimicrons in diameter. These silica dispersions are prepared by methods well-known in the art and are commercially available under such registered trademarks as "Ludox" and "Nalcoag". It is preferred to use colloidal silica of 10-30 millimicron particle size in order to obtain dispersions having a greater stability and to provide coatings having superior optical properties. Colloidal silicas of this type are relatively free of $Na_2O$ and other alkali metal oxides, generally containing less than 2 weight percent, preferably less than 1 weight percent, $Na_2O$. They are available as both acidic and basic hydrosols. Colloidal silica is distinguished from other water dispersible forms of $SiO_2$, such as nonparticulate polysilicic acid or alkali metal silicate solutions, which are not operative in the practice of the present invention.

The pigment-free coating composition can be prepared by slowly adding a trialkoxysilane, or mixture of several, to a titania sol with stirring. A sufficient amount of water to provide at least twice the stoichiometric amount of water necessary to completely hydrolyze the alkoxy groups present on the trialkoxysilane should be present. The water can be derived from water present in the titania sol or else can be added before the addition of the trialkoxysilane. Alcohol will be generated by the hydrolysis of the trialkoxysilane(s) and will become part of the solvent mixture. Heat is also generated during the hydrolysis of the trialkoxysilane(s) and no cooling was necessary in a laboratory scale preparation of the coating compositions. However, on a larger scale operation, it may be preferable to cool the titania sol below room temperature prior to the addition of the trialkoxysilance and to maintain such a temperature (for example, 5° or 10° C.) during the addition of the trialkoxysilane to minimize the effect of the exothermic reaction on the partial condensate present in the coating composition. Additional polar organic solvent and, if any is to be used, latent condensation catalyst can then be added to produce a coating composition with the desired viscosity and non-volatile content. The well-mixed solution should be aged for a short period of time to ensure formation of the partial condensate. The pH can then be adjusted with acid to from 2 to 6 and preferably from about 2 to 4. The resulting coating composition containing colloidal titania thus obtained is a clear or slightly hazy, low viscosity fluid. The condensation of silanol continues at a very slow rate at room temperature and the composition will eventually form gel structures. Heating during the formation of the partial condensate can accelerate the condensation of silanol and can reduce the bath life of the composition at room temperature. The bath life can range from several hours to up to about a week and can be extended by maintaining the composition at or below room temperature, for example at about 5° C. (40° F.), prior to use.

Colloidal silica can be used in amounts of up to, but not including, 20 weight percent of the total solids content of the coating composition to improve the abrasion resistance of the cured coating. However colloidal silica is expensive and greatly increases the cost of the composition. As noted above, one way to incorporate colloidal silica into the coating compositions used in this invention is to add a partial condensate treated titania sol to a colloidal silica-containing composition.

The colloidal silica-containing composition is prepared by adding at least one trialkoxysilane, such as $CH_3Si(OCH_3)_3$, to a dispersion of colloidal silica (silica sol) and ajusting the pH to 3.0 to 6.0, preferably to a pH of 3.0-5.5, with the acid selected. The acid can be added to either the silane or the sol prior to mixing the two components provided that the mixing is done rapidly. The amount of acid necessary to obtain the desired pH will depend on the alkali metal content of the silica, but is usually less than one percent by weight of the composition. For the purposes of the present invention, it is preferred that the exothermic silane hydrolysis reaction be controlled, e.g. by cooling the silica sol below room temperature prior to the addition of the trialkoxysilane. Additional polar organic solvents and, if any is to be used, buffered latent condensation catalyst, is then added and the well-mixed composition is allowed to age for a short period of time to insure formation of the partial condensate. A quantity of trialkoxysilane is added to an acidic titania sol to produce a partial condensate treated titania sol which is then added to the colloidal silica containing composition. The addition can be done at room temperature or below. The quantity of trialkoxysilane added to the titania sol should be at least slightly more than that amount necessary to completely coat the titania particles and should be sufficient to provide the desired proportions of partial condensate, colloidal titania and colloidal silica in the blended composition. The pH of the composition can then be adjusted to from 2 to 6, preferably from about 2 to 4, buffered latent condensation catalyst can be added, if desired, and the final nonvolatile solids content of 15 to 40 weight percent can be reached by the addition of polar organic solvent. This method can be the most convenient when the total solids of the coating composition to be prepared contains less than about 6 weight percent of colloidal titania particles and from about 10 up to, but not including, 20 weight percent of colloidal silica. When compositions containing larger amounts of colloidal titania particles are desired, it can be more convenient to reverse the aforementioned procedure and to add a small quantity of trialkoxysilane to an acidified silica sol (exothermic heat generated during the addition of the trialkoxysilane is preferably controlled by slow addition of the trialkoxysilane to a rapidly stirring mixture or by cooling the silica sol below room temperature prior to said addition) to form a partial condensate treated silica sol which can then be added to a coating composition containing the required amount of colloidal titania particles and partial condensate. The pH of the composition can then be adjusted, catalyst added, if desired, and the solids content of the composition adjusted in the manner described above.

Another alternative method for the preparation of a composition containing both colloidal silica and colloidal titania is to prepare a mixed sol by adding a mixture of an alkyl titanate and an acid directly to a silica sol at room temperature and allowing the dispersion to clear. The colloidal titania particles are formed in situ and the mixed sol is then treated in the same manner as outlined above to produce a coating composition for use in the method of the present invention.

The coating composition described above consist essentially of colloidal titania particles and, if desired, a certain amount of colloidal silica particles dispersed in a solution of the siloxanol (or partial condensate) in a water/polar organic solvent cosolvent. At least one polar organic solvent must be present in the coating compositions used in the method of the present invention. Such a solvent can be a water-miscible polar organic solvent such as the alcohols previously described as being useful in stabilizing the titania sols, alcohols derived from the hydrolysis of the alkoxysilanes, ketones such as acetone and other polar solvents such as tetrahydrofuran. Polar organic solvents which are only slightly water-miscible can also be used if there is a sufficient amount of other water-miscible polar organic solvent present to act as a cosolvent. Examples of slightly water-miscible polar organic solvents are n-butanol, isobutanol and higher alcohols, glycol ethers such as those derived from ethylene glycol such as ethylene glycol dimethyl ether and ethylene diethyl ether, and glycol ether esters such as ethylene glycol monoethyl ether acetate. Liquid organic carboxylic acids, such as glacial acetic acid, can also function as polar organic solvents and should be considered to be part of the solvent system.

The solvent system (total water, polar organic solvent and liquid acid) should contain from about 20 to 90 weight percent alcohol to insure solubility of the siloxanol. Other types of polar organic solvents, both water-miscible and slightly water-miscible polar organic solvents, may be present, but preferably, they should not exceed 60 weight percent of the total amount of polar organic solvent present. Polar organic solvents with boiling points greater than 150° C. (300° F.) can increase the amount of time necessary to cure the coating and it is advisable to limit the amounts of such solvents to that amount which will provide acceptable cure times.

It is also possible to alter the original water/solvent composition by vacuum stripping some of the water and some of the alcohol produced by hydrolysis during the formation of the partial condensate and then adding back the desired amount of polar organic solvent, especially when the solvent to be added is only slightly water miscible. Vacuum stripping does not ordinarily remove all of the alcohol present, thus a sufficient amount is usually present to render the slightly-miscible solvent compatible with the coating composition. Some compositons, especially those which contain more than about 10 weight percent of colloidal titania, can gel when vacuum stripped and are thus not amended to the use of this technique.

Isopropanol is a preferred alcohol and generally the use of at least 25 to 50 weight percent of isopropanol based upon the total weight of polar organic solvent present is preferred. The use of such amounts may improve the adhesion of the coatings to the substrates. Polar organic solvents such as n-butanol or glycol ether solvents such as ethylene glycol monoethyl ether or ethylene glycol monoethyl ether acetate can be used to improve the shelf life of the above compositions and typically, the parts by weight employed is equal to the parts by weight of isopropanol added to the composition.

Buffered latent silanol condensation catalyst can be added to the composition so that the milder curing conditions can be utilized and to maximize hardness and abrasion resistance, but are not necessary to produce coatings which render non-ferrous metal substrates more resistant to corrosion. Alkali metal salts of carboxylic acids, such as sodium acetate, are one class of such latent catalysts. The amine carboxylates and quaternary ammonium carboxylates are another such class of latent catalysts. Of course, the catalysts must be soluble, or at least miscible, in the cosolvent system. The catalysts are latent to the extent that at room temperature, they do not appreciably shorten the bath life of the composition. Buffered catalysts are used to avoid detrimental effects caused by variations in the pH of the compositions.

Certain commerically available colloidal silica dispersions contain free alkali metal base which reacts with the organic acid during the adjustment of the pH to generate carboxylate catalysts in situ. This is particularly true when starting with a silica hydrosol having a pH of from 8 to 9. The titania sols produced by the hydrolysis of an alkyl titanate are free of such alkali metals. The coating compositions can be catalyzed by the addition of carboxylates such as dimethylamine acetate, ethanolamine acetate, dimethylaniline acetate, tetraethylammonium benzoate, sodium acetate, sodium propionate or benzyltrimethylammonium acetate. The amount of catalyst can be varied depending upon the desired curing conditions, but at about 1.5 weight percent catalyst in the coating composition, the bath life is shortened and the transparency of the coating to visible light may be impaired. When a catalyst is employed, it is preferable to utilize from about 0.05 to 1 weight percent of the catalyst. Sodium acetate is a preferred catalyst. Small amounts of other types of additives such as surfactants or flow-control agents can be used in these coating compositions to improve the appearance of the cured film. Such additives are well known to those skilled in the art.

To obtain liquid coating compositions which will produce an economical cured coating with optimum resistance to corrosion when employed in the method of the present invention, it is preferred to utilize a coating composition having a pH in the range of about 2 to 4 which contains from 15 to 25 weight percent solids; the colloidal titania portion consisting of from 5 to 20 weight percent of the solids, said colloidal titania having an average particle size in the range of about 5 to 40 millimicrons in diameter; the remainder of the solids consisting essentially of a partial condensate of a trisilanol calculated as $CH_3SiO_{3/2}$, said solids being present as a dispersion in a cosolvent of water and polar organic solvents, said polar organic solvents being methanol, glacial acetic acid and approximately equal parts by weight of either isopropanol and n-butanol or isopropanol and ethylene glycol monobutyl ether. Such a coating composition is reasonably stable, generally having a bath life of from one day to a week at room temperature.

In accordance with the method of the present invention, the coating compositions are coated on non-ferrous metal substrates such as aluminum, copper or brass. The method used to apply such a coating is not critical and conventional methods such as flow coating, spincoating, spraying or dipping are satisfactory provided that the method chosen is capable of forming a continuous surface film. The method of the present invention is especially useful in rendering aluminum substrates more resistant to corrosion and when aluminum substrates are to be coated, glacial acetic acid is the preferred acid.

Once the substrate is coated, the coating composition is cured. The term "cured" is intended to means that the volatile portion of the coating composition is removed and the remaining silanol ($\equiv$SiOH) groups present in the partial condensate are condensed to form a cross-linked coating which is hard and resistant to the effects of both solvents and corrosive materials such as acids or alkali metal salts. Although the coating composition will air-dry to a tack-free condition and some of the remaining silanol groups will condense, heating in the range of from 50° C. to 150° C. is necessary to effect condensation of a significant portion of the remaining silanol groups in the partial condensate. Higher temperatures can be used to reduce the time required to cure the coating, especially if very short cure times are required. However, lower cure temperatures such as 100° C. to 120° C. are preferred to save oven heating costs and higher levels of buffered latent condensation catalysts can be employed to reduce the cure time required.

This final cure results in the formation of a silsesquioxane which consists essentially of units of the average formula $CH_3SiO_{3/2}$ and it is believed that the silsesquioxane forms a matrix surrounding the colloidal particles, thereby resulting in an optically transparent coating. Because of the ability of titanium dioxide to absorb ultraviolet radiation, the amount of such radiation reaching the metal surface below decreases as the amount of colloidal titania in the coating or the thickness of a coating containing the same amount of colloidal titania is increased.

Cure times for the coating compositions will vary according to the nature of the solvent system and will also depend upon whether or not a buffered latent condensation catalyst is present. In general, cure times of from six hours (using a sodium acetate catalyst) to about sixteen hours (overnight cure in an oven when no catalyst was added) at 110° C. is adequate. The relatively mild cure temperature is also an advantage of the present method as compared with other methods such as that set out in U.S. Pat. No. 3,101,277 to Eder et al., discussed above, wherein a methyltrialkoxysilane, and optionally, a small amount of a catalyst such as an alkyl titanate, was cured at a temperature of at least 350° C. Less fuel is required to maintain curing ovens at lower temperatures and the reduced fuel cost contributes to the economy of the operation unless high speed operations are required. Corrosion resistance and adhesion of the coating to the metal substrate can be improved by preparing the surface of the substrate by well known means such as solvent wiping or particularly in the case of aluminum substrates, through the use of a commercially available aqueous alkaline metal cleaner. The coating thickness can be varied by means of the particular application technique employed, but coatings of about 0.5 to 20 microns, preferably from 2 to 10 microns, are generally employed. Multiple coatings can be utilized although such coatings may decrease the hardness of the coatings and for reasons of commercial efficiency, one coating utilizing a coating composition at a higher solids level can be preferable to two or more coats of a composition having a lower level of solids. A solids content of at least 15 weight percent of the total composition is needed to give satisfactory coatings while the upper limit is based on practical considerations such as the bath life (higher solids compositions tend to have a shorter bath life) and viscosity of the composition.

Non-ferrous metal articles, especially aluminum articles, obtained in accordance with the method of the present invention are useful in applications where resistance to corrosion by acids is important such as in the form of ornamental trim exposed to sources of atmospheric pollution such as sulfur dioxide and as containers for food. Likewise, the method of the present invention enables one to prepare non-ferrous metal articles such as automobile hubcaps or bumpers and ornamental trim items for use on boats which are resistant to the effects of alkali metal salts such as road salt or sea water and are coated with a transparent coating which allows the metal itself to be seen. The method is economical to use because the coating composition is primarily composed of relatively inexpensive methyltrialkoxysilane and solvents and only a small amount of more expensive ingredients such as titania sol and, if any is used, silica sol. The composition can also be cured using relatively low curing temperatures and thus reduces the cost of operating curing ovens.

The following testing procedures were used to evaluate the cured coatings:

A. The pencil hardness of the coatings was determined using cured coating deposited on glass plates because the coatings were harder than the metal substrate, e.g., aluminum has a pencil hardness of about 2 H. The test procedure is well known and employs pencil leads with varying hardness values corresponding to the scale 3 B, 2 B, B, HB, F, H, 2 H, 3 H on through 9 H, the hardness of the lead increasing as the scale progresses to the right. Pencil leads of increasing hardness are held at a 45° angle relative to the plane of the coating and moderate force is applied. The pencil hardness is reported as the hardness of the pencil lead which breaks through the coating.

B. The adhesion of the coating was measured by applying a strip of cellophane tape (Scotch$^{TM}$ Brand No. 600 available from the 3M Company, St. Paul, MN 55119) to a coated substrate and pulling the tape away from the coating. This process was repeated two more times and any loss of adhesion observed was recorded.

C. A quick, quantitive test for measuring the scratch resistance of a coating (glass substrate) was the pencil eraser test. The test was carried out by rubbing an ordinary pencil eraser against the coating ten times and visually evaluating the extent of scratching as very slightly abraded (VSA), slightly abraded (SA) or abraded (A).

D. Several different corrosion tests were employed and are hereinafter referred to by test number:

(a.) Corrosion Test No. 1—A solution of 10 parts by weight of concentrated hydrochloric acid, 20 parts by weight of copper (II) sulfate and 70 parts by weight of water was prepared. Metal panels coated on both sides were dipped into the above solution for five minutes at room temperature and were then examined for signs of corrosion. If no corrosion was observed, then the same panel was scribed to the bare metal with a razor blade and again dipped into the above solution for five minutes at room temperature. It was then removed and examined for signs of corrosion at the scribe. The extent of corrosion was visually evaluated as: No Corrosion (NC) or Badly Corroded (BC) for the unscribed panels and as No Corrosion in the Vicinity of the scribe (NCV), Little Corrosion in the Vicinity of the scribe (LCV) or Corroded in the Vicinity of the scribe (CV).

(b.) CASS Test—This test procedure is described in ASTM—B368 and is called the Copper-Accelerated Acetic Acid Salt Spray Corrosion Resistance Test. Duplicate coated metal panels were placed in a Corrosion Test Chamber (Model GS-SCH-22, G.S. Equipment Co., Cleveland, OH) and were exposed at 120±2° F. to a fine mist of 5±1 percent aqueous sodium chloride solution with a pH adjusted to 3.2±0.1 by the addition of acetic acid. To each gallon of the acid salt solution was added one (1) gram of cupric chloride. The density of this mist was such that 1.5±0.5 ml of solution per hour over a 24 hour period of time was collected on an 80 square centimeter horizontal area. The test panels were mounted with the significant surfaces inclined approximately 15 degrees from vertical. The samples were exposed for a period of time, removed, checked for corrosion and then returned to the chamber for further exposure. The panels were checked for corrosion after 2, 4, 6, 8, 24, 48, 72 and 100 hours exposure. The results are reported as the number of hours to failure and is expressed in terms of two time periods. The first time given is the total amount of exposure the panel had received without failing the test and the second time period is the next time that the panel was checked and was judged to have failed the test. Thus, the panel failed at some time between the two time periods reported. A panel was judged to have failed the test when five or more areas of visible corrosion at least 0.16 cm (1/16 inch) in diameter were present on the coated panel.

The following examples are merely illustrative and are not to be considered as limiting the scope of the present invention, which is properly delineated in the following claims. All parts and percentages expressed in the following examples are by weight unless otherwise stated.

EXAMPLE 1

A colloidal titania dispersion or titania sol was prepared by adding 70 grams (g) of glacial acetic acid to 30 g of tetraisopropyl titanate. Then, 60 g of water was added to the acidified titanate while stirring. The mixture was agitated by shaking until the sol was homogeneous. The resulting clear sol contained about 5.3 percent titania (calculated as $TiO_2$), exhibited the Tyndall Effect, i.e., the scattered light was blue, and was found to consist essentially of rather monodispersed irregular-shaped particles falling in the range of 7.8 to 31 millimicrons (nanometers) in diameter. Electron diffraction studies showed that the particles were composed of anatase titanium dioxide.

EXAMPLE 2

Another titania sol demonstrating the use of hydrochloric acid and isopropanol was prepared. A dilute solution of hydrochloric acid was prepared by adding 1 gram of concentrated hydrochloric acid (37% HCl) to 5 grams of water. Five grams of isopropanol was added to 2 grams of tetraisopropyl titanate and this mixture was slowly added to 6 grams of the dilute hydrochloric acid solution with stirring. Large gel particles formed initially upon addition of the titanate solution, but the solution became homogeneous and clear after agitation on a shaker for one hour. The homogeneous sol exhibited the Tyndall Effect, i.e., the scattered light was blue, contained approximately 4.3% titania (calculated as $TiO_2$) and had a pH of 2.0.

EXAMPLES 3–5

These examples demonstrate the method used in preparing coating compositions containing colloidal titania for use in the method of the present invention and also the physical properties of the cured coatings. The coating composition of Example 3 was prepared by slowly adding 5 grams (g) of methyltrimethoxysilane to 5 g of the titania sol (described below) which contained approximately 4.8% titania calculated as $TiO_2$. Then, 5 g of isopropanol was added, followed by 0.1 g of a buffered latent condensation catalyst solution which was prepared by dissolving 10 g sodium acetate in 100 grams of a 1:1 solution of water:isopropanol (hereinafter referred to as Catalyst Solution). Example 4 was a comparative example (the calculated solids content of the coating is only 10%) which was prepared as above using the following formulation: 1 g methyltrimethoxysilane, 2 g of the above titania sol, 3 g isopropanol and 0.1 g of Catalyst Solution. Example 5 was a comparative example which did not contain colloidal titania and was prepared in the same manner as Example 3 using the following formulation: 5 g of methyltrimethoxysilane, 2 g of a solution consisting of 7 g water and 7.5 glacial acetic acid which was used in place of the titania sol used in Example 3, 5 g isopropanol and 0.1 g Catalyst Solution. The above compositions had a bath life of at least 24 hours at room temperature.

The 4.8% titania sol used in these examples was prepared by adding 30 g of tetraisopropyl titanate to a stirring solution of 70 g of water and 75 g of glacial acetic acid. When the addition was complete, some white particulate matter was noted in the sol. These white particles were no longer present in the sol after the sol was stirred overnight. The sol was filtered prior to use, and had a pH of 1.83.

Films were cast from the coating compositions prepared in Examples 3–5 by flow coating each composition onto flat panels of glass and aluminum at room temperature and suspending the panels vertically for 20–30 minutes to allow the coatings to air dry before placing them in an oven to cure for about 6 hours at 110° C. The dimensions of the glass panels 10.2 cm ×2.5 cm ×0.16 cm (4"×1"×1/16" where the symbol "indicates inches) and were cleaned with isopropanol prior to coating. The dimensions of the aluminum panels were 10.2 cm ×2.5 cm ×0.064 cm (4"×1"×0.025") and were prepared for coating by cleaning them with an aqueous alkaline metal cleaner (Oakite ® Aluminum Cleaner 166, commercially available from Oakite Products, Inc., Derkely Heights, NJ) until the surface was wetted by water. The properties of the cured coatings were evaluated and the results are summarized in Table I. Also tabulated is the theoretical amount of colloidal titania ($TiO_2$) present expressed as a percentage of the theoretical solids content assuming that the remainder of the solids is composed of a silsesquioxane of the formula $CH_3SiO_{3/2}$ and non-volatile catalyst.

TABLE I

| | Coating Composition | | Cured Coating | | | |
|---|---|---|---|---|---|---|
| | | % TiO₂ in | Pencil | Pencil | Corrosion Test No. 1 | |
| Example | % Solids | Solids | Hardness | Eraser Test | Unscribed | Scribed |
| 3 | 18 | 9 | 6H | A | NC | NCV |
| 4 | 10 | 16 | 6H | A | NC | NCV |
| 5 | 20 | 0 | 7H | SA | BC | — |

EXAMPLE 6

A titania sol was prepared as follows: 7 g of tetraisopropyl titanate was mixed with 20 g of isopropanol and then added slowly (with stirring) to a solution consisting of 8 g of water and 4.5 g concentrated nitric acid. Water bath cooling was used during the addition of the tetraisopropyl titanate/isopropanol mixture. The resulting titania sol was clear, exhibited the Tyndall Effect, i.e., the scattered light was blue, contained approximately 5% titania (calculated as TiO₂) and became unstable after about four days at room temperature—the sol precipitated.

After the sol was prepared, 4 g of methyltrimethoxysilane was slowly added to 2 g of the sol with stirring. Stirring was continued until the mixture became clear, then 2 drops of Catalyst Solution was added. The resulting composition (calculated to contain about 35% solids, of which about 5% was calculated to be TiO₂) was flow coated on a glass plate, cured by placing the slide in an oven for 2 hours at 200° C. and the pencil hardness of the film was found to be about 7H. This example demonstrates the use of nitric acid-containing titania sols to form coating compositions which can be useful in the method of the present invention.

EXAMPLE 7

A mixed sol of colloidal titania and silica was prepared by generating the colloidal titania in situ by addition of an alkyl titanate to an acidic dispersion of colloidal silica. Thus, 2 grams of a commercially available, acidic aqueous dispersion of colloidal silica containing 34% solids silica of approximately 15 millimicron particle size having an initial pH of 3.1 and Na₂O content of less than 0.01% was diluted with 8 grams of water. This diluted sol was slowly added to a mixture of 2 grams of tetraisopropyl titanate and 8 grams of glacial acetic acid with stirring. The resulting dispersion was stirred until it became homogeneous. The mixed titania-silica sol contained 2.8% colloidal titania and 3.4% colloidal silica (calculated as TiO₂ and SiO₂ respectively.

Two coating compositions were prepared following the procedure described for Example 3. Example 7A had the following formulation: 2 g of the above mixed sol and 1 g of methyltrimethoxysilane. Example 7B had the same formulation as Example 7A, but additionally contained 10 drops of Catalyst Solution. Glass slides were flow-coated with each composition and were cured at 110° C. for almost 24 hours. Both coated slides exhibited a pencil hardness of 6H and Example 7B had a pencil eraser test rating of VSA. The compositions gelled upon standing at room temperature overnight.

When an aluminum substrate is coated with the above compositions and cured by heating, the aluminum substrate is rendered more resistant to corrosion by acids or salts.

EXAMPLES 8–18

In these examples, compositions containing varying levels of colloidal titania and, in some cases, colloidal silica, were subjected to accelerated corrosion testing according to the previously described CASS Test. This test has been used by automobile manufacturers to evaluate coatings for use on aluminum articles such as bumpers or hubcaps which are typically exposed to corrosion-inducing agents such as road salt.

The titania sol was prepared by dripping 45 g of tetraisopropyl titanate into a rapidly stirring mixture of 60 g of water and 60 g of glacial acetic acid. Stirring was continued for about one hour after the addition was complete, at which time a clear solution which exhibited the Tyndall Effect, i.e., scattered light was blue in color, and contained about 7.7% titania (calculated as TiO₂) was obtained. The coating compositions used in each example were prepared by mixing the amounts of the above titania sol and methyltrimethoxysilane indicated in Table III together and simply shaking the mixture together and allowing the silane to hydrolyze and form a partial condensate (typically 30 minutes allowed for the hydrolysis to take place). In Examples 8–15, the water was added to the titania sol just before the methyltrimethoxysilane was added. In Examples 13, 15 and 17, the silica sol used was the same type of sol that was employed in Example 7. In these Examples, 10% by weight of the methyltrimethoxysilane was added to the silica sol in the same fashion as described above for the titania sol to form a partial condensate-treated silica sol. The remainder of the methyltrimethoxysilane was added to the titania sol as described above. After allowing about 30 minutes for hydrolysis to occur, the partial condensate-treated silica sol was mixed together with the partial condensate-treated titania sol. In all cases, the solvent mixture was added after the samples had been allowed to hydrolyze.

After the solvent was added, each composition was flowcoated onto both sides of several 7.6 cm × 11.4 cm × 0.64 mm (3"×4.5"×0.025") aluminum panels which had been cleaned with an aqueous alkaline cleaner as described in Examples 3–5. The panels were then allowed to air-dry for about 15 minutes and were cured in an oven at 120° C. for about 16 hours. Duplicate panels of each composition except for Example 8 were subjected to CASS Testing. The results are found in Table III. Examples 8–10 inclusive are comparative examples. This test indicates that at a calculated solids content of 20%, the best level of titania is form 5%–20% and the presence of colloidal silica appears to slightly decrease the corrosion resistance.

Another set of unscribed panels was subjected to Corrosion Test No. 1 and all panels were rated NC after 5 minutes. Previously, Example 5 (which contained catalyst) was rated BC after 5 minutes, but had only been cured for 6 hours at 110° C. while Example 8 was cure for about 16 hours at 120° C. Even at the lower temperature and cured time, Examples 3 and 4 (which also contained catalyst) were rated NC and NCV respectively.

Compositions having the same formulation as Examples 8, 14 and 15 were prepared at a later time and the pH of each composition was determined to be: Example 8—pH 3.5; Example 12—pH—3.3, Example 14—pH—3.1, and Example 15—pH—3.1, Example 16—pH—2.7 and Example 17—pH—3.3.

TABLE III

| | Coating Composition - Formulation | | | | | Composition | | | |
|---|---|---|---|---|---|---|---|---|---|
| Example | MTMS[3] | Titania Sol | Silica Sol | Water | Solvent Mixture[2] | % Solids | % TiO$_2$ In Solids | % SiO$_2$ In Solids | CASS Test[1] (hours) |
| 8 | 20.4 | — | — | 8.1 | 21.5 | 20 | 0 | 0 | 24/48 |
| 9 | 18.3 | — | 2.9 | 5.3 | 23.5 | 20 | 0 | 10 | 8/24; 24/48 |
| 10 | 16.5 | — | 5.6 | 2.8 | 25.1 | 20 | 0 | 19 | 24/48; 24/48 |
| 11 | 19.9 | 3.2 | — | 6.7 | 20.2 | 20 | 2.5 | 0 | 24/48; 48/72 |
| 12 | 19.3 | 6.5 | — | 5.3 | 18.9 | 20 | 5 | 0 | 48/72; 48/72 |
| 13 | 18.3 | 6.5 | 1.5 | 3.9 | 19.8 | 20 | 5 | 5 | 24/48; 48/72 |
| 14 | 18.3 | 13.0 | — | 2.5 | 16.2 | 20 | 10 | 0 | 72/100; 72/100 |
| 15 | 16.3 | 13.0 | 2.9 | 1.8 | 16.0 | 20 | 10 | 10 | 48/72; 48/72 |
| 16 | 16.3 | 26.0 | — | — | 7.7 | 20 | 20 | 0 | 48/72; 48/72 |
| 17 | 14.5 | 13.0 | 5.6 | — | 16.9 | 20 | 10 | 19 | 24/48; 48/72 |
| 18 | 15.3 | 32.5 | — | — | 18.9 | 15 | 25 | 0 | 8/24; 24/48 |

[1]Duplicate panels were tested in all examples except for Example 8 where only one panel was tested.
[2]Solvent mixture - 1:1 weight ratio of isopropanol: ethylene glycol monobutyl ether
[3]MTMS is methyltrimethoxysilane That which is claimed is:

1. A method of rendering a non-ferrous metal substrate more resistant to corrosion which comprises the steps of
   (I) coating a non-ferrous metal substrate with a pigment-free composition capable of forming an optically transparent cured coating which consists essentially of a dispersion of at least one colloidal metal oxide in a water/polar organic solvent solution of a partial condensate of a silanol having the average formula CH$_3$Si(OH)$_3$, said colloidal metal oxide being prepared by a solution precipitation method and being selected from the group consisting of colloidal titania and both colloidal titania and colloidal silica, said composition containing from 15 to 40 weight percent solids wherein said solids consist essentially of from 1 to 25 weight percent of said colloidal titania and from 0 up to, but not including, 20 weight percent of said colloidal silica, the remainder of said solids consisting essentially of said partial condensate calculated as CH$_3$SiO$_{3/2}$, said composition containing a sufficient amount of acid to provide a pH in the range of from 2 to 6, and
   (II) curing said coating.

2. The method as claimed in claim 1 wherein the non-ferrous metal substrate is selected from the group consisting of aluminum, copper and brass.

3. The method as claimed in claim 2 wherein the non-ferrous metal substrate is aluminum.

4. The method as claimed in claim 3 wherein the colloidal silica has an average particle size in the range of 10 to 30 millimicrons in diameter.

5. The method as claimed in claim 3 wherein the solids of said pigment-free composition contains from 5 to 20 percent by weight of colloidal titania having an average particle size in the range of 5 to 40 millimicrons in diameter.

6. The method as claimed in claim 5 wherein said colloidal titania is obtained by the complete hydrolysis of tetraisopropyl titanate in an aqueous acidic medium.

7. The method as claimed in claim 5 wherein said pigment-free composition contains at least one polar organic solvent selected from the group consisting of lower aliphatic alcohols containing from 1 to 4 inclusive carbon atoms, glycol ether alcohols, glycol ethers and glycol ether esters.

8. The method as claimed in claim 7 wherein the acid present in said pigment-free composition is acetic acid.

9. The method as claimed in claims 1, 4 or 8 wherein said pigment-free coating composition contains from 0.05 to 1.5 weight percent of a buffered latent silanol condensation catalyst.

10. The method as claimed in claim 9 wherein the buffered latent condensation catalyst is sodium acetate.

11. The method as claimed in claim 1 wherein the non-ferrous metal substrate is aluminum, the colloidal metal oxide is colloidal titania having an average particle size in the range of 5 to 40 millimicrons in diameter, said colloidal titania being obtained by the complete hydrolysis of tetraisopropyl titanate in an aqueous acidic medium, said water/polar organic solvent medium consisting essentially of water, methanol, isopropanol, glacial acetic acid and an alcohol selected from the group consisting of n-butanol and ethylene glycol monobutyl ether, said composition containing from 15 to 25 weight percent solids wherein said solids consist essentially of from 5 to 20 weight percent of said colloidal titania and the remainder of said solids consist essentially of a partial condensate obtained by the hydrolysis of methyltrimethoxysilane in the presence of at least 1.5 moles of water per mole of methyltrimethoxysilane, said composition containing a sufficient amount of glacial acetic acid to provide a pH in the range of from about 2 to 4, and wherein said coating is cured by heating at a temperature of from 50° C. to 150° C.

* * * * *

UNITED STATES PATENT AND TRADEMARK OFFICE
CERTIFICATE OF CORRECTION

PATENT NO. : U.S. 4,311,738

DATED : January 19, 1982

INVENTOR(S) : Frank K. Chi

It is certified that error appears in the above—identified patent and that said Letters Patent is hereby corrected as shown below:

Column 2, line 29, "disperion" should read --dispersion--.

Column 4, line 18, "alklaine" should read --alkaline--.

Column 6, line 1, "parital" should read --partial--.

Column 7, line 64, "gave" should read --give--.

Column 8, line 9, "Ti(Or')$_4$" should read --Ti(OR$^1$)$_4$--.

Column 8, line 11, delete the second appearance of "tetraisopropyl titanate".

Column 11, line 10, "composition" should read --compositions--.

Column 11, line 29, insert --glycol-- between the words "ethylene" and "diethyl".

UNITED STATES PATENT AND TRADEMARK OFFICE
CERTIFICATE OF CORRECTION

PATENT NO. : 4,311,738

DATED : January 19, 1982

INVENTOR(S) : Frank K. Chi

It is certified that error appears in the above—identified patent and that said Letters Patent is hereby corrected as shown below:

Column 11, line 57, "compositons" should read --compositions--.

Column 12, line 6, delete the word "the" which precedes the word "milder".

Column 17, line 53, "respectively." should read --respectively).--

Column 18, line 68, "cure" should read --cured--.

Signed and Sealed this

Twenty-first Day of December 1982

[SEAL]

Attest:

GERALD J. MOSSINGHOFF

Attesting Officer    Commissioner of Patents and Trademarks